(12) United States Patent
Tang

(10) Patent No.: US 12,237,786 B1
(45) Date of Patent: Feb. 25, 2025

(54) MOTOR CONTROL METHOD AND DEVICE

(71) Applicant: Monumo Limited, Saffron Walden (GB)

(72) Inventor: Mi Tang, Saffron Walden (GB)

(73) Assignee: Monumo Limited, Essex (GB)

( * ) Notice: Subject to any disclaimer, the term of this patent is extended or adjusted under 35 U.S.C. 154(b) by 0 days.

(21) Appl. No.: 18/748,934

(22) Filed: Jun. 20, 2024

(51) Int. Cl.
*H02P 21/00* (2016.01)
*H02P 21/14* (2016.01)
*H02P 21/22* (2016.01)

(52) U.S. Cl.
CPC .............. *H02P 21/22* (2016.02); *H02P 21/14* (2013.01); *H02P 2203/01* (2013.01)

(58) Field of Classification Search
CPC ................................. H02P 21/22; H02P 21/14
USPC ...................................................... 318/400.02
See application file for complete search history.

(56) References Cited

U.S. PATENT DOCUMENTS

| 7,119,530 | B2* | 10/2006 | Mir | ...................... | G01R 31/343 |
| | | | | | 318/803 |
| 9,590,541 | B2* | 3/2017 | Pollock | .................... | H02P 21/04 |
| 2020/0130732 | A1* | 4/2020 | Pramod | .................... | H02P 23/14 |
| 2020/0287495 | A1* | 9/2020 | Burke | ...................... | H02P 21/22 |

FOREIGN PATENT DOCUMENTS

| CN | 114400946 A | 4/2022 |
| CN | 116015130 A | 4/2023 |

\* cited by examiner

*Primary Examiner* — Erick D Glass
(74) *Attorney, Agent, or Firm* — Harness, Dickey & Pierce, P.L.C.

(57) ABSTRACT

In one embodiment, the method includes i) obtaining target data specifying desired operating parameters of a switched reluctance motor, ii) obtaining data indicative of a value of a measured drive current for each of the phase outputs of an associated inverter, iii) converting the measured drive current values from a stationary reference frame into reference current values in a rotating reference frame, iv) generating, based on the reference current values and the target data and the set of inductance values, updated reference voltage values in the rotating reference frame, v) converting the updated reference voltage values from the rotating reference frame into updated voltage values in the stationary reference frame, and vi) controlling the inverter to set the voltages of the phase outputs to the updated voltage values.

17 Claims, 8 Drawing Sheets

MOTOR CONTROL METHOD AND DEVICE

TECHNICAL FIELD

The present disclosure relates to digital closed-loop control of a multi-phase inverter for driving a switched reluctance motor.

BACKGROUND

A switched reluctance motor (SRM) is a type of electrical motor. The stator of a SRM has windings to which switching currents are delivered to drive the motor, while the rotor has no windings or permanent magnets (PM). SRMs have become popular due to their robustness and simple mechanical design. To achieve a good motor performance (e.g. high efficiency, high speed, low torque ripple, and the like), the drive currents of the SRM need to be accurately controlled. It is therefore desirable to provide improved motor control techniques.

SUMMARY

According to a first aspect of the invention, a method for digital closed-loop control of currents driving a switched reluctance motor (SRM). The SRM is connected to phase outputs of an inverter and presents a set of inductance values comprising, for each phase, a self-inductance value and, for each pair of phases, a mutual inductance value. The SRM may be a multi-phase SRM and the inverter a corresponding multi-phase inverter. The method comprises:
  i) obtaining target data specifying desired operating parameters of the switched reluctance motor;
  ii) obtaining data indicative of a value of a measured drive current for each of the phase outputs of the inverter;
  iii) converting the measured drive current values from a stationary reference frame into reference current values in a rotating reference frame (the rotating reference frame may be a reference frame rotating at an electrical angular speed of the SRM);
  iv) generating, based on the reference current values and the target data and the set of inductance values, updated reference voltage values in the rotating reference frame;
  v) converting the updated reference voltage values from the rotating reference frame into updated voltage values in the stationary reference frame; and
  vi) controlling the inverter to set the voltages of the phase outputs to the updated voltage values.

In some implementations, the measured drive current values may be converted from a stationary reference frame into reference current values in a rotating frame using a Clarke-Park transform.

In some implementations, each of the updated reference voltage values may be generated based on each of the reference values.

In some implementations, steps i)-vi) may be repeated for each of a plurality of iterations. In each iteration the updated reference voltage values may be derived based on:
  a discrepancy between the reference current values for the current iteration and the target data;
  the respective updated reference voltage values derived for the two directly preceding iterations, respective discrepancies between the reference current values for the two directly preceding iterations and the corresponding target data.

In some implementations, the updated reference voltage values may be generated based on voltage equations (described in more detail below) in the rotating reference frame defined as $v_{dq0}^{ref}(k) = av_{dq0}^{ref}(k-1) + (1-a)v_{dq0}^{ref}(k-2) + (1-a)\{L^{-1}R[I - e^{-L^{-1}RT_s}]^{-1}e^{0.5\omega T_s J}Li_{dq0}^{err}(k) - L^{-1}R[I - e^{-L^{-1}RT_s}]^{-1}e^{0.5\omega T_s J}Le^{-(L^{-1}R+\omega j)T_s}i_{dq0}^{err}(k-1) - k_v i_{dq0}^{err}(k-2)\} + A_v i_{dq0}^{fbk}(k)$.

In some implementations, the method may further comprise obtaining data specifying a measured rotation angle of a rotor of the switched reluctance motor, and the updated reference voltage values may be derived based on the reference current values in the rotating frame, the target data and the measured rotation angle of the rotor.

In some implementations, the target data may specify a target torque.

In some implementations, step iv) may comprise processing the target torque and the target motor speed to generate target reference current values in the rotating frame, and wherein the updated reference voltage values are derived based on at least the reference current values and the target reference current values.

In some implementations, the inverter may be a three-phase inverter, and the SRM is a three-phase SRM. In this case, the rotating frame may be a direct-quadrature-zero, dq0, reference frame, and the three updated reference voltage values consist of a direct component, a quadrature component and a zero component in the dq0 reference frame.

In some implementations, the steps i)-vi) may be repeated at a repetition rate of 10 KHz or higher (or 70 kHz or higher).

In some implementations, the self-inductance values may be different for different phases, and/or the mutual inductance values may be different for different pairs of phases.

The set of inductance values may specify "constant" inductance values (i.e. inductance values that are independent of the rotational position of the rotor of the SRM) or "varying" inductance values (i.e. the numerical value of a respective inductance depends of the rotational position of the rotor of the SRM; in case of "varying" inductance values, the set of inductance values may specify respective parameters from which corresponding inductance values can be derived for a given rotor position (e.g. parameters defining a functional relationship between the respective inductance value and rotor position). Thus, in some implementations, the set of inductance values may specify, for at least one of the self-inductance values and the mutual inductance values, an inductance value that is independent of the rotational position of the rotor of the SRM, and/or, for at least one (other) of the self-inductance values and the mutual inductance values, parameters specifying the at least one inductance value dependent on the rotational position of the rotor of the SRM.

According to a second aspect, there is provided a controller for closed-loop control of currents driving a switched reluctance motor (SRM). The SRM is connected to phase outputs of an inverter and presenting a set of inductance values comprising, for each phase, a self-inductance value and, for each pair of phases, a mutual inductance value. The controller comprising:
  a first receiving unit for receiving target data specifying desired operating parameters of the switched reluctance motor;
  a second receiving unit for receiving data indicative of a value of a measured drive current for each of the phase outputs of the inverter (and optionally, data indicative of a rotation angle of a rotor of the switched reluctance motor);

a first converting unit configured to convert the measured drive current values from a stationary reference frame into reference current values in a rotating reference frame;

a computing unit configured to generate based on the reference current values and on the target data, updated reference voltage values in the rotating reference frame;

a second converting unit configured to convert the updated reference voltage values from the rotating reference frame into updated voltage values in the stationary reference frame; and an output unit configured to control the inverter to set the voltages of the phase outputs to the updated voltage values.

In some implementations, the controller may implement (at least) steps iii), iv) and v) of the method of the first aspect.

According to a third aspect, there is provided a system comprising the controller of the second aspect, the inverter, and the SRM. The system is configured to implement the first aspect.

According to a fourth aspect, there is provided a vehicle (e.g. a road vehicle, an aircraft, and so forth) comprising the system of the third aspect.

DETAILED DESCRIPTION

Figure 1:
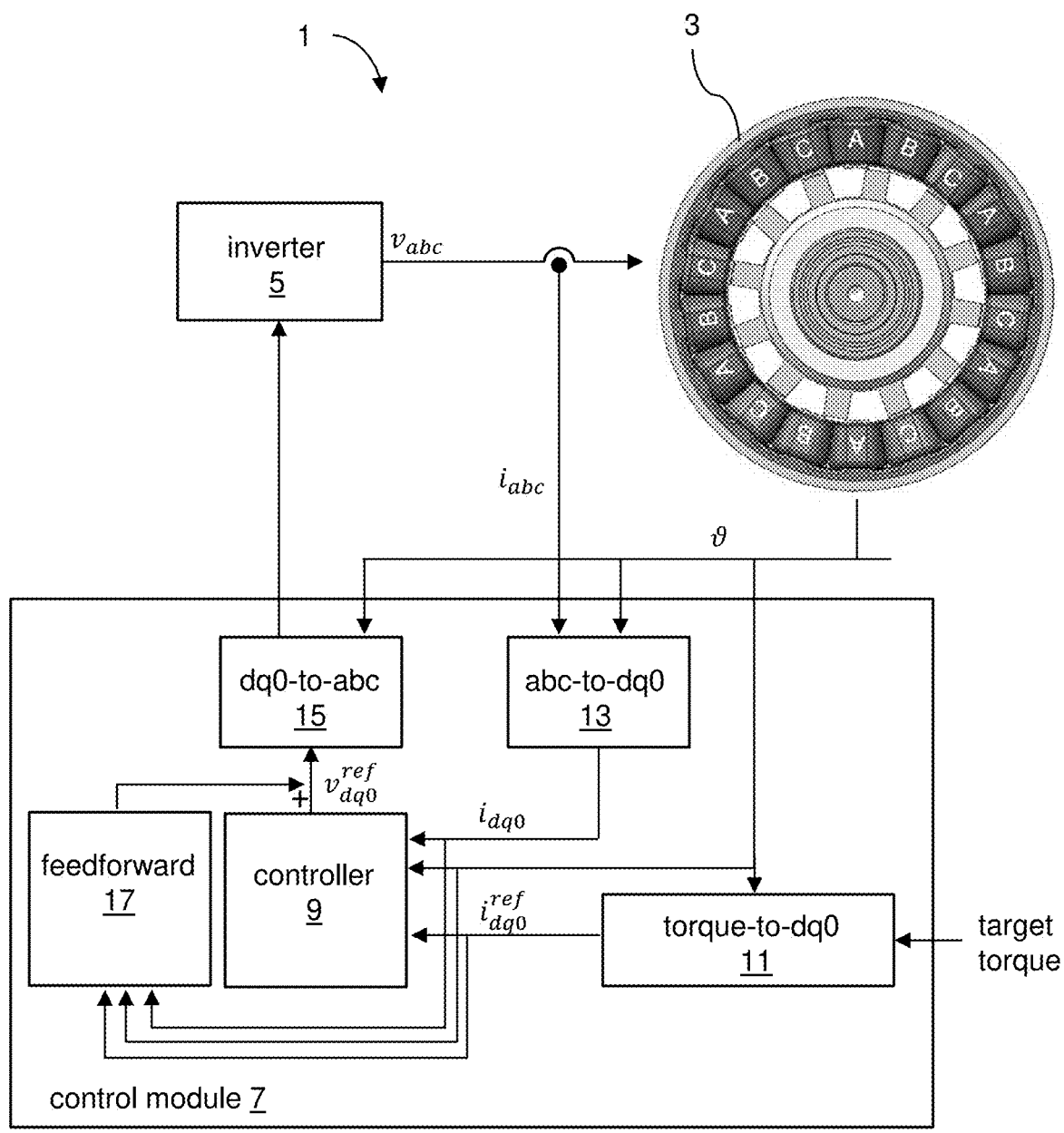
FIG. 1 is a block diagram of a motor control system according to an embodiment.

The general operating principle of a switched reluctance motor (SRM) is well-known. When a current is applied to the stator windings of an SRM, the rotor's magnetic reluctance creates a force that attempts to align the rotor pole with the nearest stator pole. To maintain rotation, an electronic control system switches on the windings of successive stator poles in sequence to pull the rotor poles forward.

For example, in a conventional three-phase SRM, a sensor is used to determine the rotational position of the rotor, and an electronic control system controls the drive currents so that a particular phase is switched on once the rotor has approached a "turn-on" angle and switched off once a "turn-off" angle has been reached. However, in practice, this simple method often results in large torque ripple. Further, when operated in this way, high speed operation of the motor is not possible because eventually the sensed rotor position lags behind the real rotor position which results in inaccurate on/off-switching.

To enable SRMs that can operate at high speed and exhibit low torque ripple, embodiments described herein propose novel closed-loop current control techniques. In broad terms, the proposed control techniques relate to field-oriented control (FOC) methods (also known as vector control methods).

Before describing the proposed techniques in more detail, conventional FOC is briefly summarised since this is useful for understanding the proposed techniques. In general, FOC methods are known for controlling the three-phase drive currents of surface mounted permanent magnet machines or inductance machines. In conventional FOC, the three-phase stator currents, represented by a vector, are projected (from a time and speed dependent system) into a two-dimensional time-invariant reference frame (this frame is commonly referred to as "dq-frame" and the two components of the projected current vector are respectively referred to as "direct" and "quadrature" components or simply "d" and "q" components). The d-component is typically associated with the magnetic flux, and the q-component with the torque of the motor. In the "dq-frame", the resulting control task is similar to that of a DC machine control. Thus, the transformation into the dq-frame is generally convenient since the magnetic field can be controlled by regulating the d-axis current, and the torque can be controlled by regulating the q-axis current. A proportional-integral (PI) controller may be used to control the d- and q-components (i.e. d- and q-components are usually controlled using independent PI-control loops). However, at high motor speeds, PI-based FOC degrades 1) because of a cross-coupling between the d- and q-axes, and 2) because, as the motor speed increases and the ratio of the switching frequency (i.e. the (fixed) frequency at which the inverter switches are being turned on and off) to the fundamental frequency (i.e. the electrical frequency of the motor which increases with increasing motor speed) reduces, the control loop becomes very sensitive to any delays, e.g. computational delays, in the system (often such PI controllers are designed by simply considering the electrical model of the motor to be $1/(L*s+R)$, i.e. a simple first order plant in the s-domain, where R is the stator resistance, L is the stator inductance).

In general, known FOC methods are not suitable for SRMs. For example, known FOC methods assume "symmetric" machines (i.e. motors with a diagonal inductance matrix in the dq-frame, such as surface mounted permanent magnet machines or inductance machines), and are not suited to control "asymmetric" machines like SRMs. Further these methods assume that the phase inductances are constant, whereas, in a SRM (and other "non-linear" machines), the phase inductances depend on the, load and rotor position. Thus, in broad terms, the mathematical framework of known FOC methods (e.g. the dimensional reduction when transforming three drive current values into a two-dimensional space) is overly simplifying and inadequate for SRMs and other "complex" machines. As further described below, the proposed techniques herein enable a novel FOC-like control method of SRMs without using PI-based control.

With reference to FIG. 1, a motor control system 1 is now described. The motor control system 1 comprises a switched reluctance motor (SRM) 3. The SRM 3 comprises an inner rotor and an outer stator. In the embodiment illustrated in FIG. 1, the SRM 3 has an 18/12 configuration, i.e. it has an 18-pole stator and a 12-pole rotor but other numbers of poles are possible (e.g. such as 6/4, 6/6, 8/6, 12/8, and the like). The SRM 3 is a three-phase SRM (in FIG. 1, the stator windings are labelled "A", "B", "C" to indicate the corresponding phase). However, the herein described control techniques are also applicable to other multi-phase SRMs. Thus, in some embodiments the SRM may be a multi-phase SRM having N phases (where N≥2), e.g. N=2, 3, 4, 5, or 6. In some embodiments, the motor control system 1 may be used within an electric vehicle.

The motor control system 1 further comprises an inverter 5 configured to provide drive currents to the SRM 3 (for driving the SRM 3). More specifically, the inverter 5 is configured to receive control signals, and to provide three-phase output signals to the SRM 3 based on the received control signals (i.e. the inverter 5 may have, for each of three phases A, B, C, a respective output coupled to the corresponding stator windings). The control signals may specify voltage values for each phase (i.e. for each of the three output signals), and the inverter 5 may set the output voltages accordingly (i.e. the inverter 5 may be voltage-source which attempts to maintain, at its outputs, the voltages specified by the received control signals). The motor phase voltages provided by the inverter 5 to the stator windings can be represented as a vector $v_{abc}$ $$v_{abc} = \begin{pmatrix} v_a \\ v_b \\ v_c \end{pmatrix}$$

where $v_a$, $v_b$, $v_c$ denote the voltages applied to the corresponding stator windings ABC.

The motor control system 1 further comprises a control module 7 configured to provide the control signals to the inverter 5. More specifically, the control module 7 is a closed-loop controller that is configured to receive (and/or store) target motor operating parameters (e.g. a target toque and/or a target motor speed), to monitor the motor phase currents/ABC and rotor position information (i.e. the rotation angle 9 of the rotor relative to the stator) to generate the control signals for the inverter 5 such that the motor is operated according to the received target motor operating parameters. The closed-loop control module 7 may be a digital controller configured to operate at a predefined update rate (or "execution rate"). In other words, the control module 7 may hold (or "latch") the values of the control signals provided to the inverter 5 for the duration of one update interval before updating the control signals based on the monitored sensor values. The update rate of the control module 7 may be 10 kHz or higher (in some embodiments the update rate may be 70 kHz or higher). In the embodiment of FIG. 1, the switching frequency of the inverter 5 is set to be half of the execution rate of the control module 7 (however in other embodiments the switching frequency of the inverter 5 may have be different).

Similar to the motor phase voltages $v_{ABC}$, the motor phase currents $I_{ABC}$ can be represented as a vector $I_{abc}$ $$I_{abc} = \begin{pmatrix} I_a \\ I_b \\ I_c \end{pmatrix}$$

where $I_a$, $I_b$, $I_c$ denote the currents provided to the corresponding stator windings ABC. The motor phase currents $I_{abc}$ may be measured by corresponding sensors (e.g. provided in the motor 3 and/or the inverter 5 (e.g. Hall effect sensors or the like)) which are in communication with the control module 7 to provide the measured values of motor phase currents $I_{abc}$. The motor phase currents $I_{abc}$ may be sampled at a sampling rate of 10 kHz or higher (in some embodiments at a sampling rate of 70 KHz or higher). In the embodiment of FIG. 1, the sampling rate of the motor phase currents $I_{abc}$ is set to be equal to the execution rate of the control module 7.

Similarly, the rotational position of the rotor may be measured by a corresponding sensor provided in the motor 3 (e.g. the motor 3 may comprise an encoder configured to detect the rotational angle ϑ of the rotor) and configured to provide the measured values of the rotational angle ϑ to the control module 7. The rotational angle ϑ of the rotor may be sampled at a sampling rate of 10 kHz or higher (in some embodiments at a sampling rate of 70 KHz or higher).

The control module 7 is configured to generate the updated control signals for the inverter 5 based on a novel FOC-like current control method which is well-suited for SRMs and other asymmetric machines. In broad terms, in contrast to known FOC methods, the proposed method employs (for a three-phase SRM) a mathematical framework based on a "three-dimensional matrix" approach, i.e. an approach in which the motor phase currents are transformed into a three-dimensional space ("dq0"-frame or "direct-quadrature-zero"-frame). In embodiments, this method may require less voltage to achieve a particular current/torque compared to conventional control methods. Further, better efficiency and less torque ripple may be achieved, in particular at high motor speed.

Figure 2:
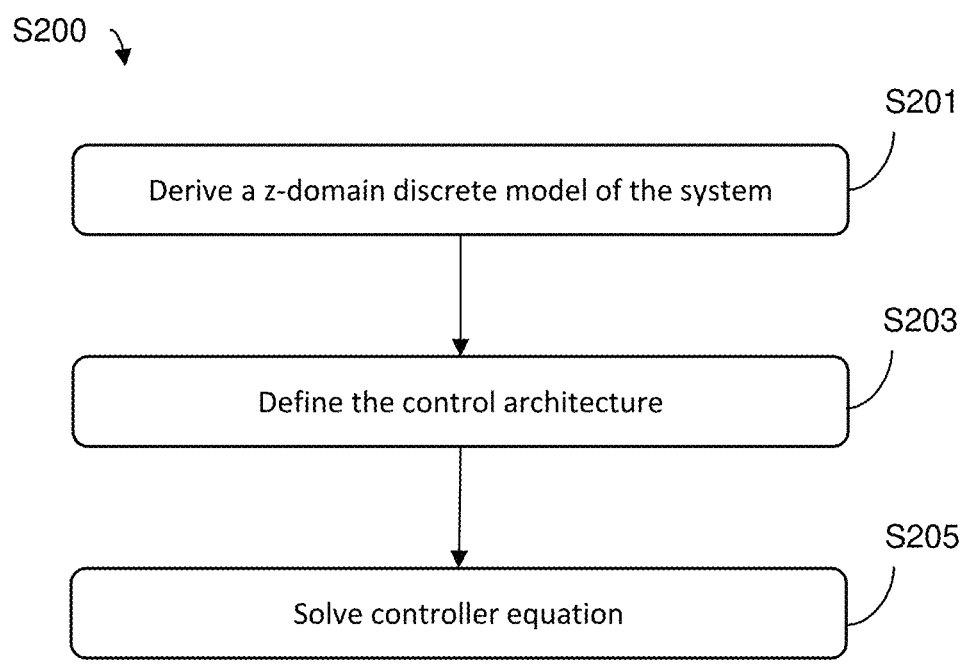
FIG. 2 is a flow diagram of an example process.

With reference to FIG. 2, a process S200 is described which can be used to derive control equations for implementing the proposed FOC-like method. The process S200 is an offline predesign process. This means that the process S200 is not executed during operation of the control system 1 (the control equations derived via process S200 are computer-implemented to execute the control loop). In the following, the process of S200 of FIG. 2 is described for the three-phase SRM 3 of FIG. 1 (however, it is to be understood that the process S200 may also be used to derive corresponding control equations for other multi-phase SRMs). In an initial step S201, a discrete model of the system is derived in the z-domain. This may be achieved by defining a (continuous time) voltage equation of the three-phase SRM, transforming the voltage equation into an appropriate rotating reference frame, and converting the transformed voltage equation into a discrete-time equation.

For example, a voltage equation of the three-phase SRM may read

Eq. (3)

$$\begin{bmatrix} v_a \\ v_b \\ v_c \end{bmatrix} = R_s \begin{bmatrix} i_a \\ i_b \\ i_c \end{bmatrix} + \frac{d}{dt}\begin{bmatrix} \lambda_a \\ \lambda_b \\ \lambda_c \end{bmatrix} = R_s \begin{bmatrix} i_a \\ i_b \\ i_c \end{bmatrix} + \begin{bmatrix} \frac{\partial \lambda_a}{\partial i_a} & \frac{\partial \lambda_a}{\partial i_b} & \frac{\partial \lambda_a}{\partial i_c} \\ \frac{\partial \lambda_b}{\partial i_a} & \frac{\partial \lambda_b}{\partial i_b} & \frac{\partial \lambda_b}{\partial i_c} \\ \frac{\partial \lambda_c}{\partial i_a} & \frac{\partial \lambda_c}{\partial i_b} & \frac{\partial \lambda_c}{\partial i_c} \end{bmatrix} \frac{d}{dt}\begin{bmatrix} i_a \\ i_b \\ i_c \end{bmatrix} + \begin{bmatrix} \frac{\partial \lambda_a}{\partial \theta} \\ \frac{\partial \lambda_b}{\partial \theta} \\ \frac{\partial \lambda_c}{\partial \theta} \end{bmatrix} \omega$$

where $v_a$, $v_b$, $v_c$ denote the voltages applied to the corresponding stator windings ABC or terminal voltage (as described above), $\lambda_a$, $\lambda_b$, $\lambda_c$ denote the three-phase flux linkages, $i_a$, $i_b$, $i_c$ denote the currents achieved at the corresponding stator windings ABC (as described above), $R_s$ denotes the stator resistance per phase, $$\omega = \frac{\partial \theta}{\partial t}$$

denotes the electrical angular speed (θ denotes the electrical angular position) (the term "mechanical angle" refers to the angle of rotor relative to the stator, while the "electrical angle" or "electrical angular position" is the mechanical angle times the number of poles of the stator of the SRM). The diagonal elements of the "partial flux linkage over partial current matrix"

$$\begin{bmatrix} \frac{\partial \lambda_a}{\partial i_a} & \frac{\partial \lambda_a}{\partial i_b} & \frac{\partial \lambda_a}{\partial i_c} \\ \frac{\partial \lambda_b}{\partial i_a} & \frac{\partial \lambda_b}{\partial i_b} & \frac{\partial \lambda_b}{\partial i_c} \\ \frac{\partial \lambda_c}{\partial i_a} & \frac{\partial \lambda_c}{\partial i_b} & \frac{\partial \lambda_c}{\partial i_c} \end{bmatrix}$$

represent self-inductances of the stator windings while the off-diagonal elements represent mutual inductances. In the following, we use $$\frac{\partial \lambda}{\partial i}$$

as shorthand for the partial flux linkage over partial current matrix and $$\frac{\partial \lambda}{\partial \theta}$$

as shorthand for the partial flux linkage over partial θ vector.

Notably, Eq. (1) does not assume a symmetric machine-unlike known FOC methods. As mentioned above, a symmetric machine is a machine with a diagonal inductance matrix in the dq-frame which means that, in the ABC-frame, 1) all self-inductances are equal (i.e.

$$\left(\text{i.e. } \frac{\partial \lambda_a}{\partial i_a} = \frac{\partial \lambda_b}{\partial i_b} = \frac{\partial \lambda_c}{\partial i_c}\right)$$

and 2) all mutual inductances are equal (i.e.

$$\left(\text{i.e. } \frac{\partial \lambda_a}{\partial i_a} = \frac{\partial \lambda_a}{\partial i_b} = \ldots\right).$$

For a SRM or other asymmetric machine, the self-inductances and mutual-inductances are different and depend on the rotor position (i.e.

$$\left(\text{i.e. } \frac{\partial \lambda_a}{\partial i_a} \neq \frac{\partial \lambda_b}{\partial i_b} \neq \frac{\partial \lambda_c}{\partial i_c} \text{ and } \frac{\partial \lambda_a}{\partial i_a} \neq \frac{\partial \lambda_a}{\partial i_b} \neq \ldots\right).$$

It is to be understood that for a particular SRM design, corresponding values for the self-inductances and mutual-inductances (for various rotor positions) can be determined (or estimated) via computational simulations or via experiments. Although, in general, these inductances vary as a function of the rotor position, the inventors have found that in many cases (e.g. for the scenarios described below with reference to FIGS. 6 to 9) it is sufficient to approximate the inductances using constant values (i.e. the proposed method may not require that the inductance parameters are obtained with very high accuracy).

Next, the voltage equation is transformed into an appropriate rotating frame. This may be achieved by sequentially applying two intermediate transformations (e.g. sequentially applying the well-known Clarke and Parks transformations). More specifically, a Clarke transformation in its power invariant form may be used for a first transformation into an "αβ0"-frame (in other embodiments, a different transformation may be applied as a first transformation, e.g. an amplitude-invariant Clarke transformation. The power invariant Clarke transformation may be defined as $$\begin{bmatrix} x_\alpha \\ x_\beta \\ x_0 \end{bmatrix} = T_1 \begin{bmatrix} x_a \\ x_b \\ x_c \end{bmatrix}, T_1 = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \\ \frac{\sqrt{2}}{2} & \frac{\sqrt{2}}{2} & \frac{\sqrt{2}}{2} \end{bmatrix},$$

$$\begin{bmatrix} x_a \\ x_b \\ x_c \end{bmatrix} = T_1^{-1} \begin{bmatrix} x_\alpha \\ x_\beta \\ x_0 \end{bmatrix}$$

Eq. (2)

where $x_\alpha$, $x_\beta$, $x_0$ denote the transformed coordinates and $T_1$ denotes the transformation matrix of the Clarke transformation ($T_1^{-1}$ is the corresponding inverse transformation matrix). Multiplying both sides of Eq. (1) with $T_1$ results in $$T_1 \begin{bmatrix} v_a \\ v_b \\ v_c \end{bmatrix} = R_s T_1 \begin{bmatrix} i_a \\ i_b \\ i_c \end{bmatrix} + T_1 \frac{\partial \lambda}{\partial i} \frac{d}{dt} \begin{bmatrix} i_a \\ i_b \\ i_c \end{bmatrix} + T_1 \frac{\partial \lambda}{\partial \theta} \omega$$

which can be rewritten as $$\Rightarrow \begin{bmatrix} v_\alpha \\ v_\beta \\ v_0 \end{bmatrix} = R_s \begin{bmatrix} i_\alpha \\ i_\beta \\ i_0 \end{bmatrix} + T_1 \frac{\partial \lambda}{\partial i} T_1^{-1} \frac{d}{dt} \begin{bmatrix} i_\alpha \\ i_\beta \\ i_0 \end{bmatrix} + T_1 \frac{\partial \lambda}{\partial \theta} \omega$$

Eq. (3)

where $v_\alpha$, $v_\beta$, $v_0$ denote the transformed voltage components. A second transformation may be applied to the transformed voltage components $v_\alpha$, $v_\beta$, $v_0$. More specifically, a Park transformation may be used (here we assume the "d" axis is aligned with the "A" axis when θ=0) to transform the "αβ0" coordinates into the (final) "dq0" frame, $$\begin{bmatrix} x_d \\ x_q \\ x_0 \end{bmatrix} = T_2 \begin{bmatrix} x_\alpha \\ x_\beta \\ x_0 \end{bmatrix}, T_2 = \begin{bmatrix} \cos\theta & \sin\theta & 0 \\ -\sin\theta & \cos\theta & 0 \\ 0 & 0 & 1 \end{bmatrix}, \begin{bmatrix} x_\alpha \\ x_\beta \\ x_0 \end{bmatrix} = T_2^{-1} \begin{bmatrix} x_d \\ x_q \\ x_0 \end{bmatrix}$$

Eq. (4)

where $x_d$, $x_q$, $x_0$ denote the transformed coordinates in the "dq0"-frame and $T_2$ denotes the transformation matrix of the Park transformation ($T_2^{-1}$ is the corresponding inverse transformation matrix). Multiplying both sides of Eq. (3) with $T_2$ results in $$\begin{bmatrix} v_d \\ v_q \\ v_0 \end{bmatrix} = R_s \begin{bmatrix} i_d \\ i_q \\ i_0 \end{bmatrix} + T_2 T_1 \frac{\partial \lambda}{\partial i} T_1^{-1} T_2^{-1} \frac{d}{dt} \begin{bmatrix} i_d \\ i_q \\ i_0 \end{bmatrix} +$$

$$\omega T_2 T_1 \frac{\partial \lambda}{\partial i} T_1^{-1} T_2^{-1} J \begin{bmatrix} i_d \\ i_q \\ i_0 \end{bmatrix} + T_2 T_1 \frac{\partial \lambda}{\partial \theta} \omega$$

Eq. (5)

with $$J = \begin{bmatrix} 0 & -1 & 0 \\ 1 & 0 & 0 \\ 0 & 0 & 0 \end{bmatrix}$$

(notably, $e^{J\theta}=T_2^{-1}$) and where $v_d$, $v_q$, $v_0$ denote the transformed voltage components in the dq0-frame. Eq. 5 can be rewritten using the definitions $$R = \begin{bmatrix} R_s & 0 & 0 \\ 0 & R_s & 0 \\ 0 & 0 & R_s \end{bmatrix}, L = T_2T_1\frac{\partial \lambda}{\partial i}T_1^{-1}T_2^{-1}, E = T_2T_1\frac{\partial \lambda}{\partial \theta}\omega, \quad \text{Eq. (6)}$$

so that the voltage equation of the three-phase SRM 3 in the dq0-frame reads $$\begin{bmatrix} v_d \\ v_q \\ v_0 \end{bmatrix} = R\begin{bmatrix} i_d \\ i_q \\ i_0 \end{bmatrix} + L\frac{d}{dt}\begin{bmatrix} i_d \\ i_q \\ i_0 \end{bmatrix} + \omega L J \begin{bmatrix} i_d \\ i_q \\ i_0 \end{bmatrix} + E. \quad \text{Eq. (7)}$$

In simple terms, Eq. (7) may be understood to comprise terms resembling an ordinary voltage equation of an resistor and an inductor connected in series (i.e.

$$R\begin{bmatrix} i_d \\ i_q \\ i_0 \end{bmatrix} + L\frac{d}{dt}\begin{bmatrix} i_d \\ i_q \\ i_0 \end{bmatrix}$$

as well as additional "fictitious" contributions due to the change of bases into the rotating frame. As mentioned before, the inductance matrix L in the dq0-frame is generally not diagonal for SRMs.

Eq. (7) is a set of coupled equations that model the SRM in continuous time, i.e. that describe how the $i_{dq0}$ currents and the $v_{dq0}$ voltages evolve over time as continuous-time signals. In other words, Eq. (7) models the SRM as a continuous-time dynamic system. We now turn to the description of a discrete-time (i.e. a digital) current controller (e.g. control module 7 of FIG. 1) to control a SRM that "implements", during operation, the continuous time equations of Eq. (7).

Figure 3:
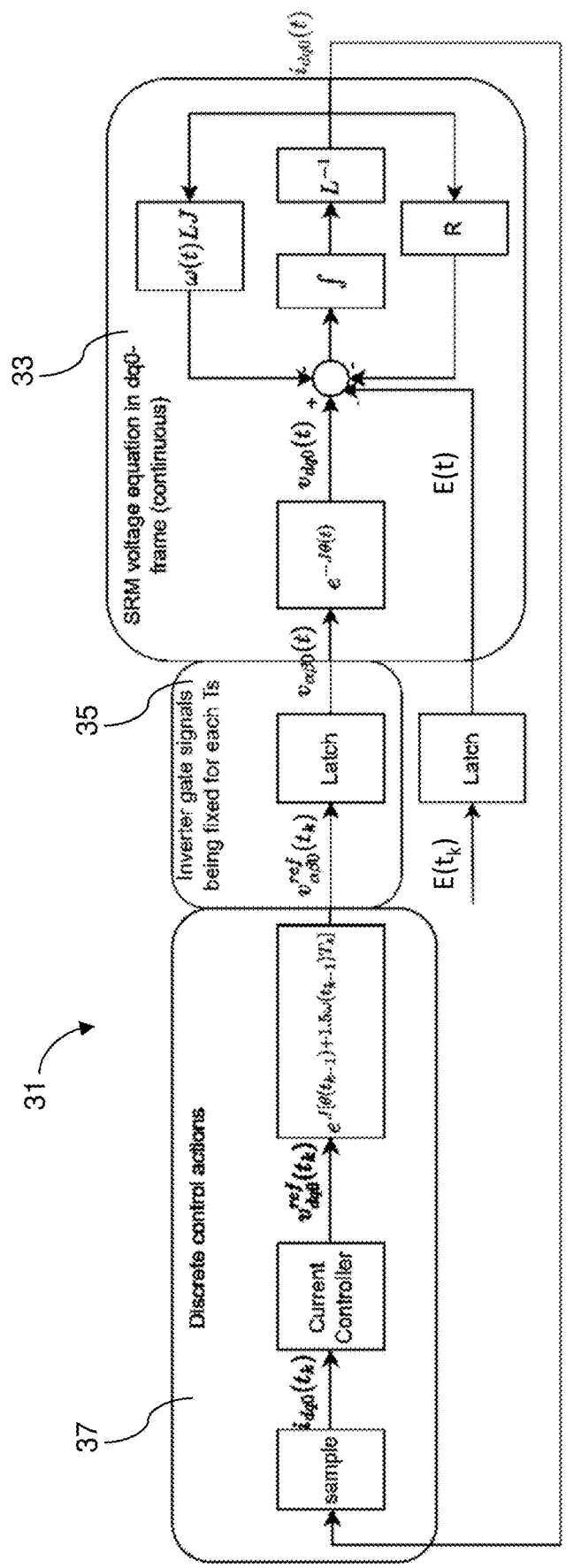
FIG. 3 is a block diagram of an example system model.

FIG. 3 shows an example system model 31 that illustrates how the digital controller may interact with the SRM. The model 31 comprises a SRM portion 33, a latch portion 35 and a control action portion 37. The SRM portion 33 represents the continuous-time motor voltage equation Eq. (7) (i.e. the dynamics of the SRM when driving voltages are applied). In contrast, discrete control actions are generated in the control action portion 37. This means that in each sample interval $T_s$ (i.e. the execution period of the current controller), the control action portion 37 samples the drive currents and generates updated dq0-voltages. The dq0-voltages are then converted into "αβ0"-voltages and latched for one sample interval $T_s$ so that the inverter receives the latched control signals.

To derive appropriate equations for generating the updated dq0-voltages as discrete-time signals, Eq. (7) may be written in discrete time. To do so, assumptions/approximations may be made. As a first example, the "E"-term in Eq. (7) may be assumed to not vary within one sampling interval $T_s$ (i.e. $E(t_k)=E(t)$ is assumed where $t_k$ indicates the k-th sampling interval). Although the "E"-term is generally time-varying and unknown (the inventors have found through numerical simulations that this term comprises mainly third harmonics of the electrical frequency (i.e. the frequency of the fundamental component of the electrical signals (currents, voltages, fluxes) due to the 12/8 geometry of the SRM 3), it may be approximated as constant during one sampling interval since this does not affect the design of the current controller (i.e. the "E"-term may be treated as a disturbance to the control plant). As a second example, the electrical speed may be assumed to be piecewise constant for directly subsequent sample intervals (since the dynamics of the mechanical system are usually much slower than the sampling rate) and to vary slowly during one sampling interval $T_s$, i.e. $\omega(t_k)=\omega(t_k-1)=\omega$, and $\theta(t)=\theta(t_k)+\omega t=\theta(t_{k-1})+2\omega t$, for $0<t<T_s$. As a third example, $v_{dq0}(t)$ may be approximated as $v_{dq0}(t)=e^{-J\theta(t)}e^{J[\theta(t_{k-1})+1.5\omega T_s]}v_{dq0}^{ref}(t_k)=e^{J[0.5\omega T_s-\omega t]}v_{dq0}^{ref}(t_k)$, where the "+1.5ωT" term compensates for the rotor movement caused by a delay between when the control actions take effect (i.e. when the inverter changes the output voltages) and when those control actions are computed. With these assumptions/approximations, the voltage equation Eq. (7) can be written in discrete time as $$e^{J[0.5\omega T_s-\omega t]}v_{dq0}^{ref}(t_k) = \quad \text{Eq. (8)}$$
$$(R+\omega LJ)i_{dq0}(t) + L\frac{d}{dt}i_{dq0}(t) + E(t_k) \Rightarrow \frac{d}{dt}i_{dq0}(t) =$$
$$-(L^{-1}R+\omega J)i_{dq0}(t) + L^{-1}e^{J[0.5\omega T_s-\omega t]}v_{dq0}^{ref}(t_k) - L^{-1}E(t_k).$$

A solution for $i_{dq0}(t_{k+1})$ can be obtained by integrating Eq. (8) from 0 to $T_s$.

$$i_{dq0}(t_{k+1}) = e^{-(L^{-1}R+\omega J)T_s}i_{dq0}(t_k) + \quad \text{Eq. (9)}$$
$$L^{-1}\int_{\tau=0}^{T_s} e^{-(L^{-1}R+\omega J)(T_s-\tau)}\left[e^{J[0.5\omega T_s-\omega\tau]}v_{dq0}^{ref}(t_k) - E(t_k)\right]d\tau =$$
$$e^{-(L^{-1}R+\omega J)T_s}i_{dq0}(t_k) + L^{-1}e^{-(L^{-1}RT_s+0.5\omega T_s J)}\left[e^{L^{-1}RT_s}R^{-1}L - R^{-1}L\right]$$
$$v_{dq0}^{ref}(t_k) - \left[L^{-1} - L^{-1}e^{-(L^{-1}RT_s+\omega T_s J)}\right](L^{-1}R+\omega J)^{-1}E(t_k)$$

Referring back to FIG. 2, Eq. (9) describes the dynamics of the discrete model (z-domain), and thus, for the described example implementation of process S200, the derivation of Eq. (9) completes step S201.

Next, in step S203, a control structure is defined and a closed loop equation is defined as a function of the desired current control bandwidth. It is known in the field of control theory that the z-domain control plant for a current control design can be derived from Eq. (9), as $$G_p(z)=[Iz-A]^{-1}Bz^{-1} \quad \text{Eq. (10)}$$

where $$I = \begin{bmatrix} 1 & 0 & 0 \\ 0 & 1 & 0 \\ 0 & 0 & 1 \end{bmatrix}, A = e^{-(L^{-1}R+\omega J)T_s}, \text{ and}$$

$$B = L^{-1}e^{-(L^{-1}RT_s+0.5\omega T_s J)}\left[e^{L^{-1}RT_s}R^{-1}L - R^{-1}L\right].$$

Figure 4:
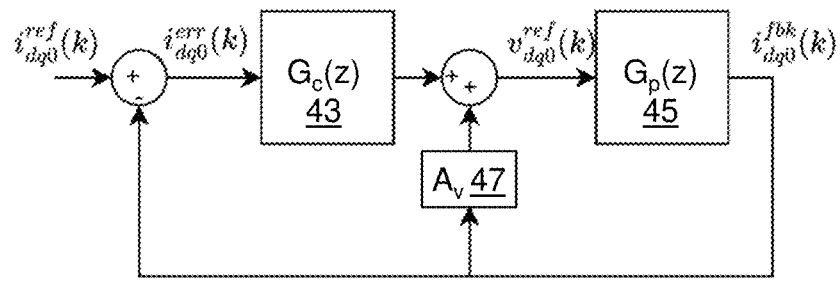
FIG. 4 is a control diagram.

A suitable example control structure 41 is shown in FIG. 4. The control structure 41 comprises the control plant $G_p(z)$ 43, a controller $G_c(z)$ 45 and a virtual resistance $A_v$ 47. In the control structure 41, the controller compares the target dq0 currents for the (k+1)-th period $i_{dq0}{}^{ref}(k+1)$ with the kth current feedback $i_{dq0}{}^{fbk}(k)$ to generate a dq0-current error $i_{dq0}{}^{err}(k)$ which processed to generate a control action for the (k+1)-th period $v_{dq0}{}^{err}(k+1)$. The control plant $G_p(z)$ with $A_v$ loop can therefore be computed as $$G_{pv}(z) = [I - A_v G_p]^{-1} G_p \qquad \text{Eq. (11)}$$

with the virtual resistance $$A_v = \begin{bmatrix} k_v & 0 & 0 \\ 0 & k_v & 0 \\ 0 & 0 & k_v \end{bmatrix}.$$

In embodiments, it may be desirable to design the controller $G_c(z)$ such that the d, q and zero currents are controlled independently from each other. It is known from the pole placement method that for a second order system like the control plant in Eq. (10), a closed loop system may be a second order system that can be defined as $$G_{cl}(z) = [Iz^2 - A_{cl} z]^{-1} [I - A_{cl}] \qquad \text{Eq. (12)}$$

where $$A_{cl} = \begin{bmatrix} e^{-2\pi f_{bw} T_s} & 0 & 0 \\ 0 & e^{-2\pi f_{bw} T_s} & 0 \\ 0 & 0 & e^{-2\pi f_{bw} T_s} \end{bmatrix}.$$

As can be seen from Eq. (11) and (12), each control loop of d, q and zero axis has its closed loop poles. One pole is located at zero Hz and another pole is located at $a = e^{-2\pi f_{bw} T_s}$ ($f_{bw}$ is known as the controller bandwidth in Hz) (it is to be understood that Eq. (12) is merely an example; in general, many ways exist of choosing the number and locations of the poles and zeros). Referring back to FIG. 2, Eq. (12) defines the closed loop equation as a function of the desired current control bandwidth, and thus, for the described example implementation of process S200, the derivation of Eq. (12) completes step S203.

Next, in step S205, the controller equation is solved. The controller $G_p(z)$ may be solved based on Eq. (10-12):

$$G_c = G_{pv}^{-1}[I - G_{cl}]^{-1} G_{cl} = G_p^{-1}[I - A_v G_p][I - G_{cl}]^{-1} G_{cl} = \qquad \text{Eq. (13)}$$

$$\frac{1-a}{z^2 - az - 1 + a} \Big\{ L^{-1} R \big[I - e^{-L^{-1} R T_s}\big]^{-1} e^{0.5 \omega T_s J} L z^2 -$$

$$L^{-1} R \big[I - e^{-L^{-1} R T_s}\big]^{-1} e^{0.5 \omega T_s J} L e^{-(L^{-1} R + \omega J) T_s} z - k_v \Big\}$$

Eq. (13) is a z-domain transfer function which can be rewritten as a discrete state space equation suitable for the digital implementation:

$$v_{dq0}{}^{ref}(k) = a v_{dq0}{}^{ref}(k-1) + (1-a) v_{dq0}{}^{ref}(k-2) + (1-a)\{L^{-1} R[I - e^{-L^{-1} R T_s}]^{-1} e^{0.5 \omega T_s J} L i_{dq0}{}^{err}(k) - L^{-1} R[I - e^{-L^{-1} R T_s}]^{-1} e^{0.5 \omega T_s J} L e^{-(L^{-1} R + \omega J) T_s} i_{dq0}{}^{err}(k-1) - k_v i_{dq0}{}^{err}(k-2)\} + A_v i_{dq0}{}^{fbk}(k). \qquad \text{Eq. (14)}$$

It can be seen from Eq. (14) that the updated voltage components in the dq0-frame $V_{dq0}{}^{ref}(k)$ may be generated based on the sensed dq0-current values for the current iteration $i_{dq0}{}^{fbk}(k)$, the dq0-current error of the current iteration $i_{dq0}{}^{err}(k)$, on the dq0-current errors of the two immediately preceding iterations $i_{dq0}{}^{err}(k-1)$, $i_{dq0}{}^{err}(k-2)$, and on the dq0-voltages of the two immediately preceding iterations voltage $v_{dq0}{}^{ref}(k-1)$, $v_{dq0}{}^{ref}(k-2)$ (i.e. the control actions that have been generated for the two immediately preceding iterations). The dq0-current errors $i_{dq0}{}^{err}(k)$, $i_{dq0}{}^{err}(k-1)$ and $i_{dq0}{}^{err}(k-2)$ may be respective differences between corresponding sensed and target values, e.g. $i_{dq0}{}^{err}(k) = i_{dq0}{}^{ref}(k) - i_{dq0}{}^{fbk}(k)$. Eq. (14) provides a closed loop current system of each of d, q and zero-axis in the form of a simple second order system with two poles (one pole at zero Hz and one at $e^{-2\pi f_{bw} T_s}$). Notably, because no approximations have been made with respect to the inductance L matrix (i.e. the inductance L matrix has not been assumed or approximated as being diagonal in the dq0-frame), the coupling effects between the d, q, 0-axes are captured in the mathematical equation of the controller (i.e. Eq. (14)). Having derived a solution for the controller (Eq. (14)), the process S200 is completed.

Although the process of FIG. 2 has been described for the case of a three-phase inverter, it is to be understood that the process is also applicable to other multi-phase inverters. For example, for N=6, the sampled current values may be transformed into a five-dimensional "dq0"-like frame (e.g. by extending the Clarke and Parks transformations to five-dimensions, d1, d2, q1, q2 and zero axes), and, accordingly, the corresponding controller equation may be solved to provide five equations to achieve closed-loop control for each coordinate in the five-dimensional "dq0"-like frame. In general, the dimensionality of the Clarke and Parks-like transformations and the resulting controller equations may be given by ceil (N/3)*2+1 where ceil(x) is the ceiling function that maps x to the smallest integer greater than or equal to x.

Referring back to FIG. 1, the control module 7 is further described. More specifically, the control module 7 may be configured to generate the updated control signals for the inverter 5 using Eq. (14) described above. To this end, the control module 7 comprises a controller and first, second and third transformation units 11, 13, 15. The first transformation unit 11 is configured to receive values for a target torque (i.e. the target torque specifies the desired operation of the motor) and the rotor angle, and to convert the target torque and the rotor angle 9 into corresponding drive current values in the dq0-frame. The first transformation unit 11 converts the target torque into corresponding drive current values in the dq0-frame based on an appropriate pre-defined look-up table (e.g. stored on memory of the control module 7) and may provide the converted drive current values to the controller 9 (the look-up table may be generated based on previously obtained experimental data, e.g. by measuring the motor's torque and speed for various dq0-drive currents and at different rotor positions). It is to be understood that, in other embodiments, the first transformation unit 11 may comprise a trained statistical model (i.e. a trained neural network) to configured to convert the target torque/speed into corresponding target current values $i_{dq0}{}^{ref}$ in the dq0-frame (i.e. in this case the first transformation unit 11 may not use the aforementioned look-up table). In some embodiments, the target torque may be generated from a target motor speed. In these implementations, the control module 7 may implement an "outer" control loop that compares the target motor speed and a feedback speed (e.g. the current speed of the motor determined from the temporal change of the rotor position) and generates the target torque based on the comparison.

The second transformation unit 13 is configured to receive (from the respective sensors) sampled values for the drive currents $i_{abc}$ and the rotor angle, to transform the received values into corresponding current values $i_{dq0}$ in the dq0- frame, and to provide the converted current values $i_{dq0}$ to the controller 9. The controller 9 is configured to receive the (sampled and converted) current values $i_{dq0}$, the sensed rotor angle 9, and the target current in, to generate control data that specify the inverter output voltages for the next execution interval.

In particular, the control data generated by the controller 9 may specify the inverter output voltages in the dq0-frame (i.e. $v_{dq0}^{ref}$). The controller 9 may generate the control data for the next iteration based on a discrepancy between the received current values $i_{dq0}$ and the target; current values $i_{dq0}^{ref}$, based on corresponding discrepancies for the two immediately preceding iterations and based on control data generated for the two immediately preceding iterations (accordingly, in this case, the controller 9 may be further configured to store the current values $i_{dq0}$, the target current values $i_{dq0}^{ref}$, and the control data for the two immediately preceding iterations). In an embodiment, the controller 9 may generate the control data based on Eq. (14). It is to be understood that the controller 9 comprises computing circuitry (e.g. a microcontroller, a computer or another type of computing device) to generate the control data.

The third transformation unit 15 is configured to receive the control data generated by the controller 9 and the rotor angle $\vartheta$, to generate corresponding control signals for the inverter which specify the inverter output voltages in the ABC-frame and to provide the converted control signals to the inverter 5. The third transformation unit 15 may be further configured to hold (or "latch") the values of the control signals provided to the inverter 5 for the duration of one update interval before updating the control signals based newly received control data from the controller 9.

In the embodiment of FIG. 1, the control module 7 further comprises a "feedforward" unit 17 configured to receive the (sampled and converted) current values $i_{dq0}$, the sensed rotor angle 9, and the target current $i_{dq0}^{ref}$ to generate provide a voltage feedforward signal which is used to modify the control data generated the controller 9 before the so-modified control data is provided to the third transformation unit 15. In particular, the voltage feedforward signal may specify voltage values that are to be added to the dq0-voltages $v_{dq0}^{ref}$ specified in the control data generated by the controller 9. Other embodiments may not include the feedforward unit 17. In broad terms, the feedforward unit may not be needed when the switching frequency is high (e.g. >35 kHz) compared to the control bandwidth (e.g. 10 kHz). However, sometimes lower switching frequencies are preferred because operating at high switching frequency may increase the inverter loss. When the switching frequency is low (e.g. similar to the control bandwidth), then the control bandwidth may not be high enough to track high frequency components in the target currents. This may be mitigated by incorporating the above described forward unit (i.e. the forward unit may effectively further increase the control dynamic of the control module). Many ways of generating appropriate feedforward signals exist. As an example, a lookup table may be used. The lookup table (e.g. stored on the control module 7) may store precomputed waveforms. As another example, a trained adaptive model (e.g. a trained neural network) may be used of generate the feedforward signals. The model may be trained on simulation data obtained using a finite-element model of the motor. Notably, the model does not need to be trained on data from an overly accurate finite-element model of the motor because any residual error between the target and the feedback current is taken care of by the controller. For example, if the feedforward unit "guesses" the required voltage with an accuracy of say 90%, the controller only needs to do the remaining 10% of the "work" and therefore may not need to be have a high control bandwidth.

Figure 5:
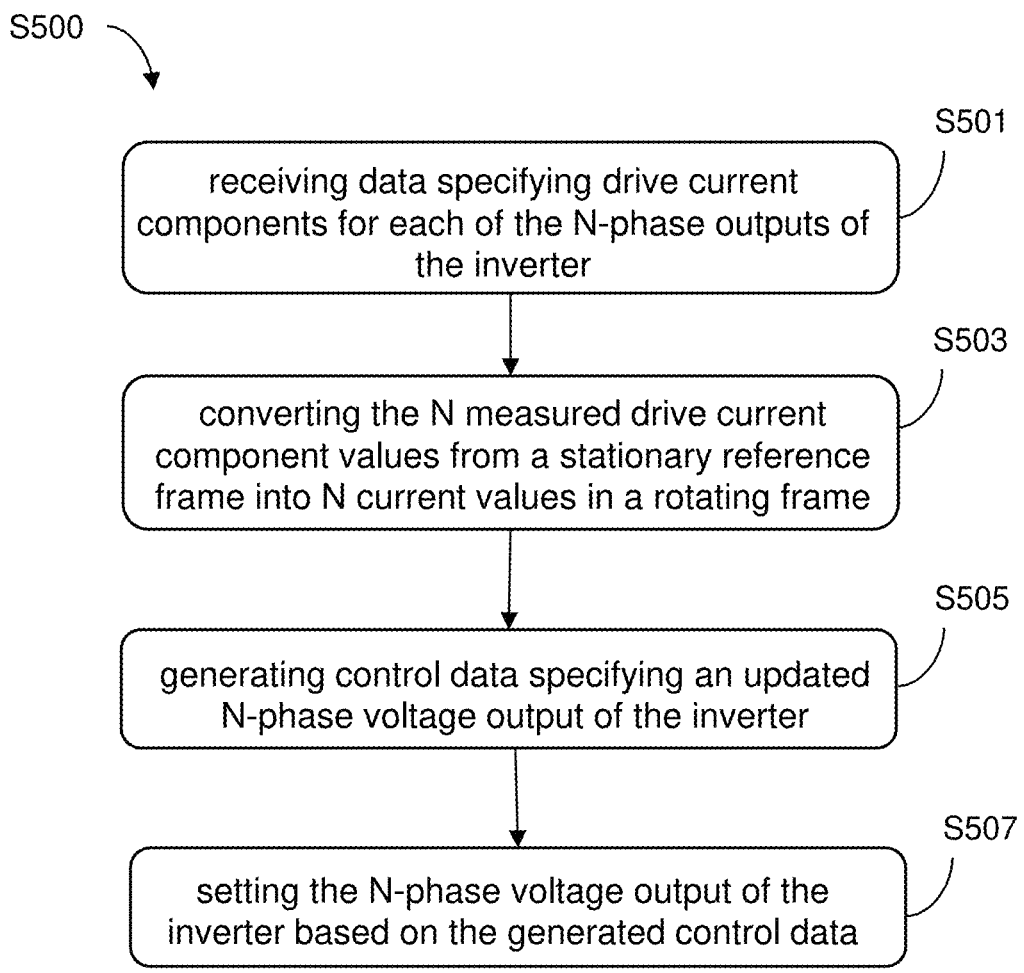
FIG. 5 is a flow diagram of a method for closed-loop control of an inverter output according to an embodiment.

With reference to FIG. 5, an example method S500 for closed-loop control of a N-phase voltage output of an inverter connected to drive a SRM is described. The method S500 of FIG. 5 may be implemented using control module 7 of the motor system 1.

In an initial step S501, data specifying drive current components for each of the N-phase outputs of the inverter is received. In some embodiments, data specifying a sensed rotation angle of a rotor of the SRM is also received in step S501. In step S503, the N measured drive current component values are converted from a stationary reference frame into M=ceil (N/3)*2+1 current values in a rotating frame (e.g. by applying the above described Clarke and Park transformations).

In step S505, control data specifying an updated N-phase voltage output of the inverter is generated based on the M reference current values in the rotating frame and on target data. The target data may specify a target operation of the SRM (e.g. a target torque or a target speed) (the target data may ultimately be provided by a user of the SRM). The control data is generated by deriving M voltage components which collectively specify the updated N-phase voltage output in the rotating-frame. More specifically, the control data may be generated based on a set of M voltage equations (which may be derived as explained above with reference to FIG. 2). The set of M voltage equations may comprise the M voltage components derived for the two directly preceding iterations, and respective discrepancies between 1) the M reference current values in the rotating frame for the current iteration and the two directly preceding iterations and 2) the corresponding target data. In particular, in case of N=3 (three-phase inverter), the set of decoupled voltage equations may be given by the above described Eq. (14). Finally, at step S507, the N-phase voltage output of the inverter is updated based on the generated control data (i.e. the generated control data may be transformed into the stationary reference frame and provided to the inverter).

Figure 6:
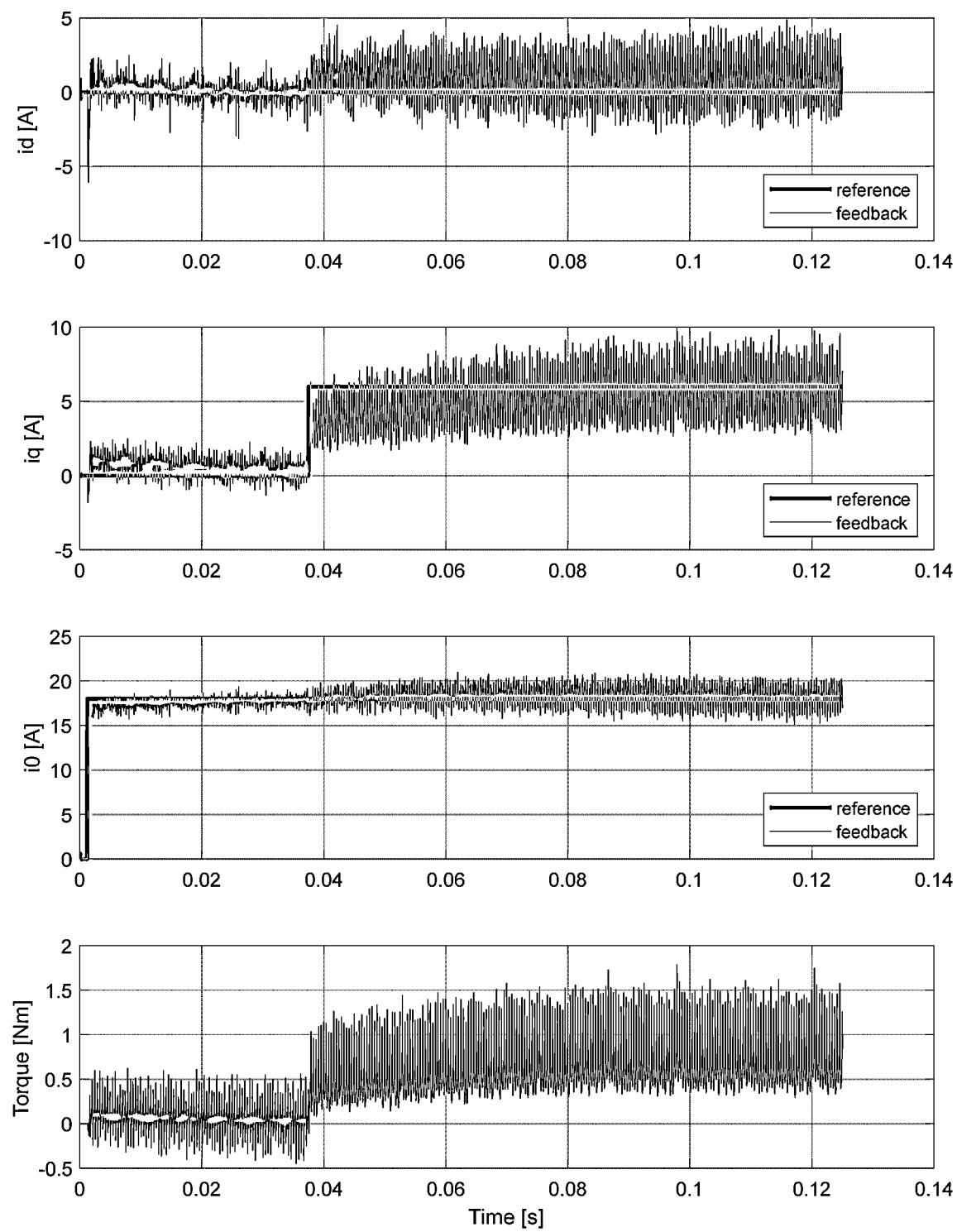
FIGS. 6 to 9 show simulation data.
Figure 7:
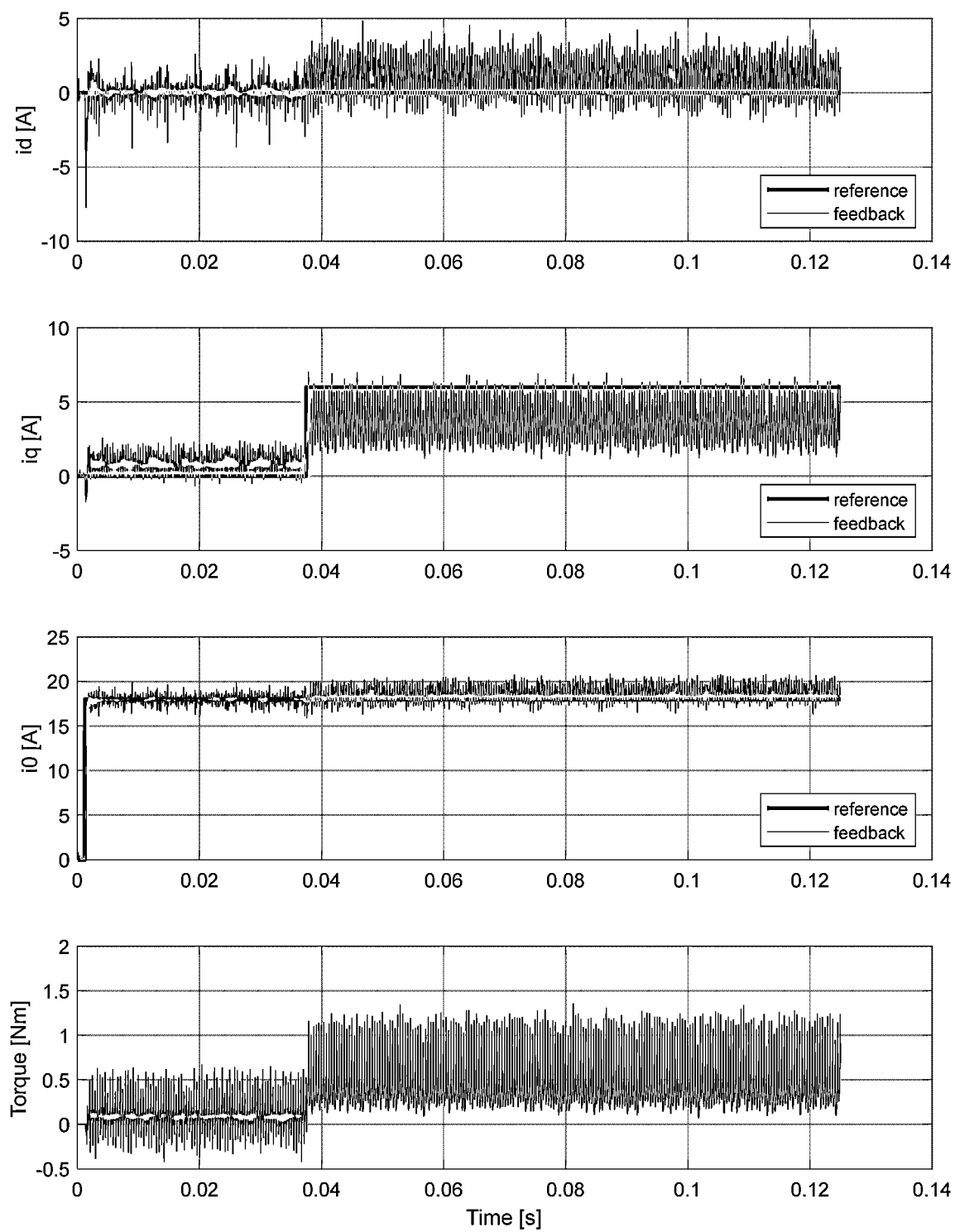
Figure 8:
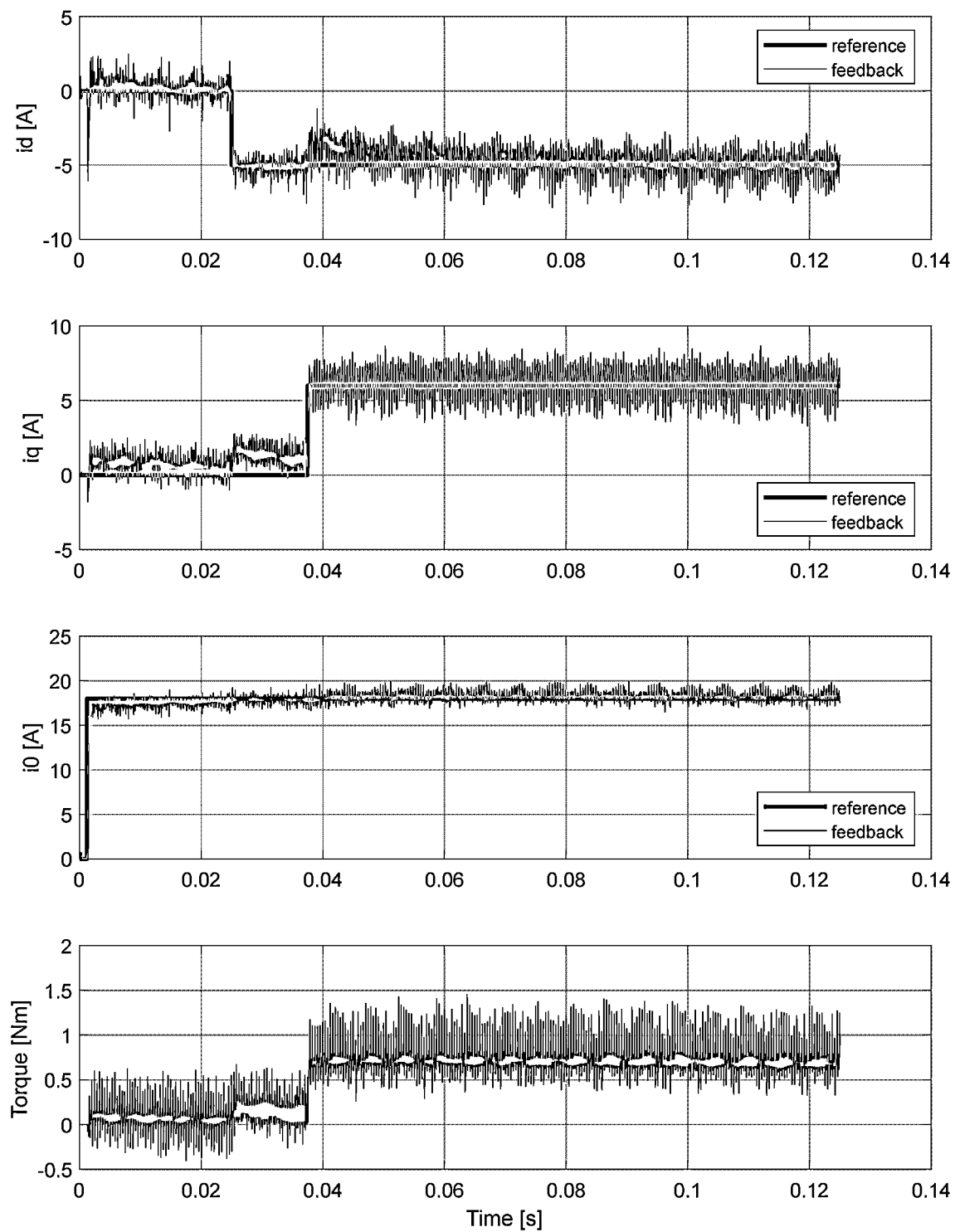
Figure 9:
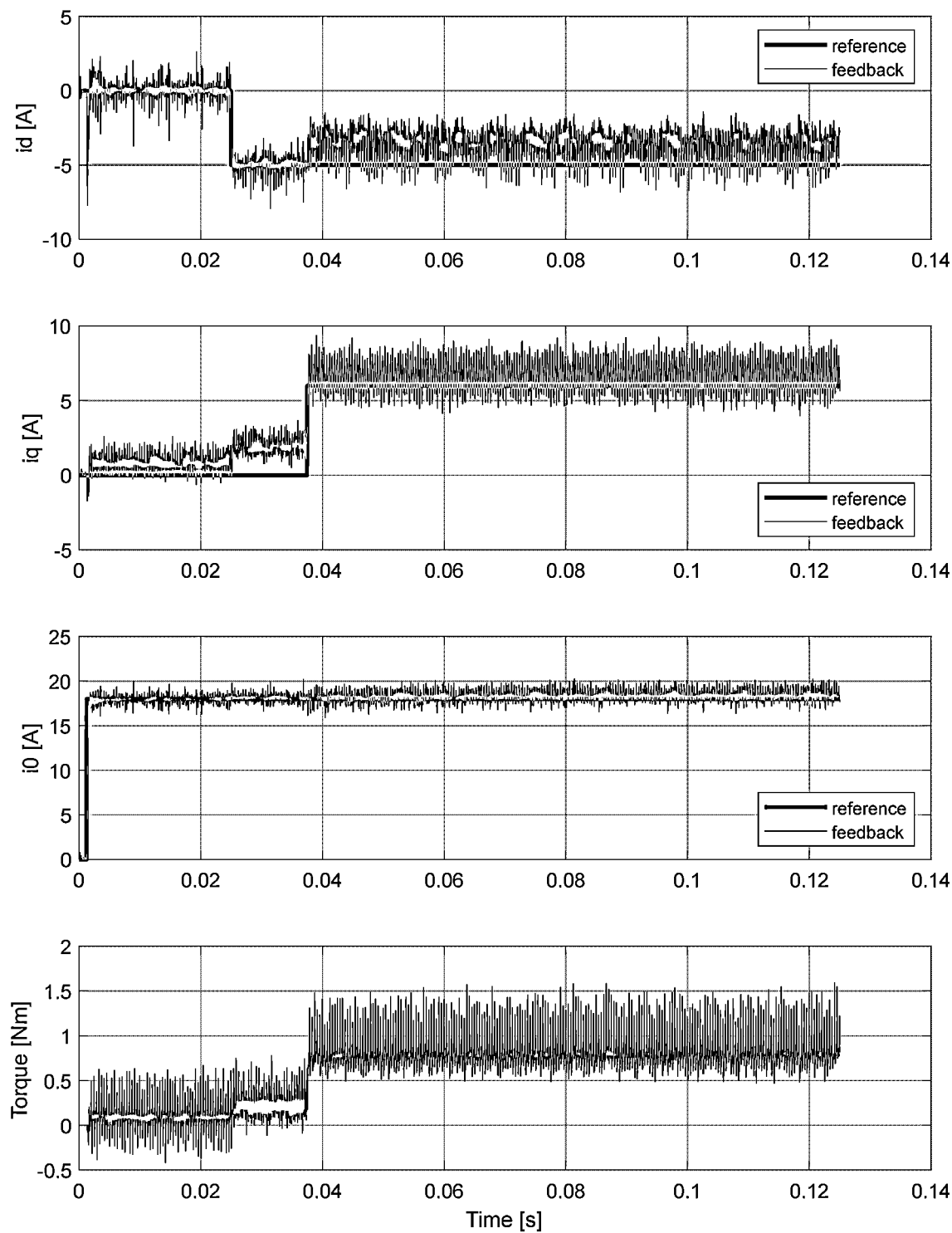

With reference to FIGS. 6 to 9, the inventors have performed numerical simulations to investigate the performance of the motor control system 1 when used to control the output of the three-phase inverter 5 to drive the SRM 3 (i.e. a SRM with a 18/12 configuration) using the process of S500. FIGS. 6, and 8 show simulation results for cases in which the inverter is controlled according to the proposed techniques, while FIGS. 7 and 9 show corresponding results for comparative examples in which a conventional PI-based control loop is used to control the inverter voltages.

FIG. 6 shows simulated results for an example configuration in which the switching frequency is 10 KHz, the sampling frequency (i.e. execution frequency of the current controller) is 20 KHz, and the speed of the SRM is 4000 rpm (thus the fundamental electrical frequency of the current is 800 Hz). More specifically, FIG. 6 shows the dynamics of the motor currents $I_{dq0}$, the target currents $i_{dq0}^{ref}$, and the corresponding output torque. It can be seen that the motor control system 1 enables the motor currents $I_{dq0}$ to reliably follow the changes of the target currents $i_{dq0}^{ref}$ (as can be seen in FIG. 6, $i_d^{ref}$ is set to 0A and is constant, $i_q^{ref}$ steps from 0A to 6A, and i"el steps from 0A to 18A). FIG. 7 shows corresponding results for a PI-based current controller. It can be seen that, in contrast to the proposed method (FIG. 6), the conventional PI-control cannot track the $I_q$ current. The improved tracking of the motor currents provided by the motor control system 1 is beneficial since this enables better estimates of how much voltage is required for bringing up the currents to the desired values.

FIG. 8 shows the dynamics of the motor currents $I_{dq0}$ and the corresponding output torque for target currents $i_{dq0}^{ref}$ that include a negative value for $I_d$. It can be seen that the motor control system 1 enables the current $I_d$ to reliably follow a step from 0 to −5A, while providing an output torque similar to FIG. 6. As shown in FIG. 9, the PI-control of the comparative example is able to track the $I_q$ current better than in FIG. 7 because of the negative $I_d$ (which reduces the voltage (i.e. field weakening)), however this comes at the expense of requiring more current to produce the same torque compared with the proposed method. Thus, although the output torque values in FIG. 6 (proposed method) and FIG. 9 (comparative example) are similar, the proposed method achieves this without $I_d$. This shows that the proposed method improves the efficiency of the motor since a particular torque level can be achieved using a lower inverter current compared to a conventional PI-control system (consequently the proposed method is less affected by constrains of the inverter). This also means that the proposed method can achieve more operating points than a conventional PI-control system.

The proposed control method is also useful for reducing undesired torque ripples. In broad terms, torque ripple compensation requires current control techniques that can accurately implement complex (e.g. optimal) current waveforms (rather than just square waves). However, at high speed, conventional PI-controllers fail to track the torque value because the inverter is operated close at its voltage limits (and thus cannot compensate the effect of motor back-emf on the DC bus voltage of inverter). The proposed control method reduces the required voltage to achieve a same level of torque leaving a larger voltage range that can be used for torque ripple compensation.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method for digital closed-loop control of currents driving a switched reluctance motor, SRM, the SRM connected to phase outputs of an inverter, the method comprising:
   i) obtaining a set of inductance values of the SRM comprising, for each phase, a self-inductance value and, for each pair of phases, a mutual inductance value;
   ii) obtaining target data specifying desired operating parameters of the switched reluctance motor;
   iii) obtaining data indicative of a value of a measured drive current for each of the phase outputs of the inverter;
   iv) converting the measured drive current values from a stationary reference frame into reference current values in a rotating reference frame;
   v) generating, based on the reference current values and the target data and the set of inductance values, updated reference voltage values in the rotating reference frame;
   vi) converting the updated reference voltage values from the rotating reference frame into updated voltage values in the stationary reference frame; and
   vii) controlling the inverter to set the voltages of the phase outputs to the updated voltage values.

2. The method of claim 1, wherein the measured drive current values are converted from a stationary reference frame into reference current values in a rotating frame using a Clarke-Park transform.

3. The method of claim 1, wherein each of the updated reference voltage values is generated based on each of the reference values.

4. The method of claim 1, wherein steps ii)-vii) are repeated for each of a plurality of iterations, and wherein in each iteration the updated reference voltage values are derived based on:
   a discrepancy between the reference current values for the current iteration and the target data;
   the respective updated reference voltage values derived for the two directly preceding iterations,
   respective discrepancies between the reference current values for the two directly preceding iterations and the corresponding target data.

5. The method of claim 4, wherein the updated reference voltage values are generated based on voltage equations in the rotating reference frame defined as, $v_{dq0}^{ref}(k)=av_{dq0}^{ref}(k-1)+(1-a)v_{dq0}^{ref}(k-2)+(1-a)\{L^{-1}R[I-e^{-L^{-1}RT_s}]^{-1}e^{0.5\omega T_s J}Li_{dq0}^{err}(k)-L^{-1}R[I-e^{-L^{-1}RT_s}]^{-1}e^{0.5\omega T_s J}Le^{-(L^{-1}R+\omega j)T_s}i_{dq0}^{err}(k-1)-k_vi_{dq0}^{err}(k-2)\}+A_vi_{dq0}^{fbk}(k)$.

6. The method of claim 1 comprising obtaining data specifying a measured rotation angle of a rotor of the switched reluctance motor, and the updated reference voltage values are derived based on the reference current values in the rotating frame, the target data and the measured rotation angle of the rotor.

7. The method of claim 1, wherein the target data specify a target torque.

8. The method of claim 7, wherein step iv) comprises processing the target torque and the target motor speed to generate target reference current values in the rotating frame, and wherein the updated reference voltage values are derived based on at least the reference current values and the target reference current values.

9. The method of claim 1, wherein the inverter is a three-phase inverter, and the SRM is a three-phase SRM.

10. The method of claim 9, wherein the rotating frame is a direct-quadrature-zero, dq0, reference frame, and the three updated reference voltage values consist of a direct component, a quadrature component and a zero component in the dq0 reference frame.

11. The method of claim 1, wherein steps ii)-vii) are repeated at a repetition rate of 10 kHz or higher.

12. The method of claim 1, wherein steps ii)-vii) are repeated at a repetition rate of 70 kHz or higher.

13. The method of claim 1, wherein the self-inductance values are different for different phases.

14. The method of claim 1, wherein the mutual inductance values are different for different pairs of phases.

15. The method of claim 1, wherein the set of inductance values specifies, for at least one of the self-inductance values and the mutual inductance values, an inductance value that is independent of the rotational position of the rotor of the SRM.

16. The method of claim 1, wherein the set of inductance values specifies, for at least one of the self-inductance values and the mutual inductance values, parameters specifying the at least one inductance value dependent on the rotational position of the rotor of the SRM.

17. A controller for closed-loop control of currents driving a switched reluctance motor, SRM, the SRM connected to phase outputs of an inverter and presenting a set of inductance values comprising, for each phase, a self-inductance value and, for each pair of phases, a mutual inductance value, the controller comprising:
- a first receiving unit for receiving target data specifying desired operating parameters of the switched reluctance motor;
- a second receiving unit for receiving data indicative of a value of a measured drive current for each of the phase outputs of the inverter;
- a first converting unit configured to convert the measured drive current values from a stationary reference frame into reference current values in a rotating reference frame;
- a computing unit configured to obtain the set of inductance values and generate based on the reference current values, the target data and the set of inductance values, updated reference voltage values in the rotating reference frame;
- a second converting unit configured to convert the updated reference voltage values from the rotating reference frame into updated voltage values in the stationary reference frame; and
- an output unit configured to control the inverter to set the voltages of the phase outputs to the updated voltage values.

* * * * *